March 16, 1926.
W. F. BETZELL
VEHICLE WHEEL
Filed June 24, 1924
1,576,895
2 Sheets-Sheet 1
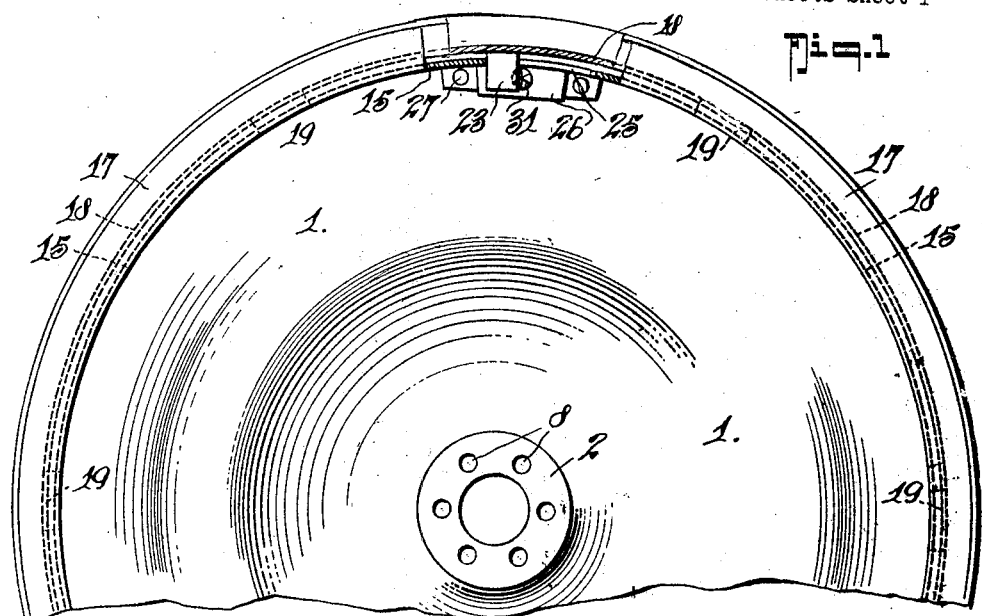
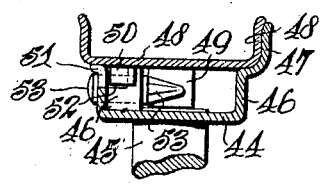
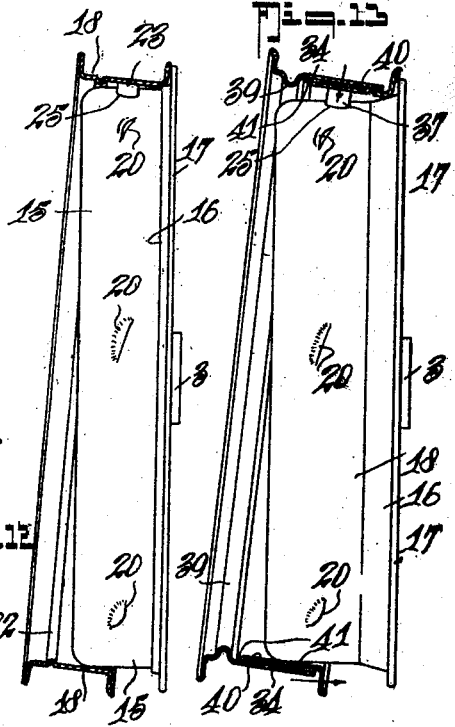
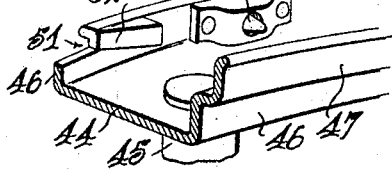
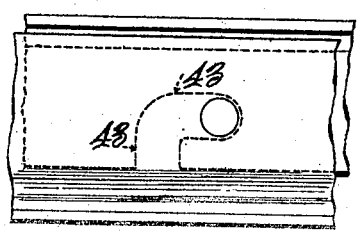
INVENTOR
William F. Betzell.
BY
ATTORNEY March 16, 1926.
W. F. BETZELL
VEHICLE WHEEL
1,576,895
Filed June 24, 1924   2 Sheets-Sheet 2
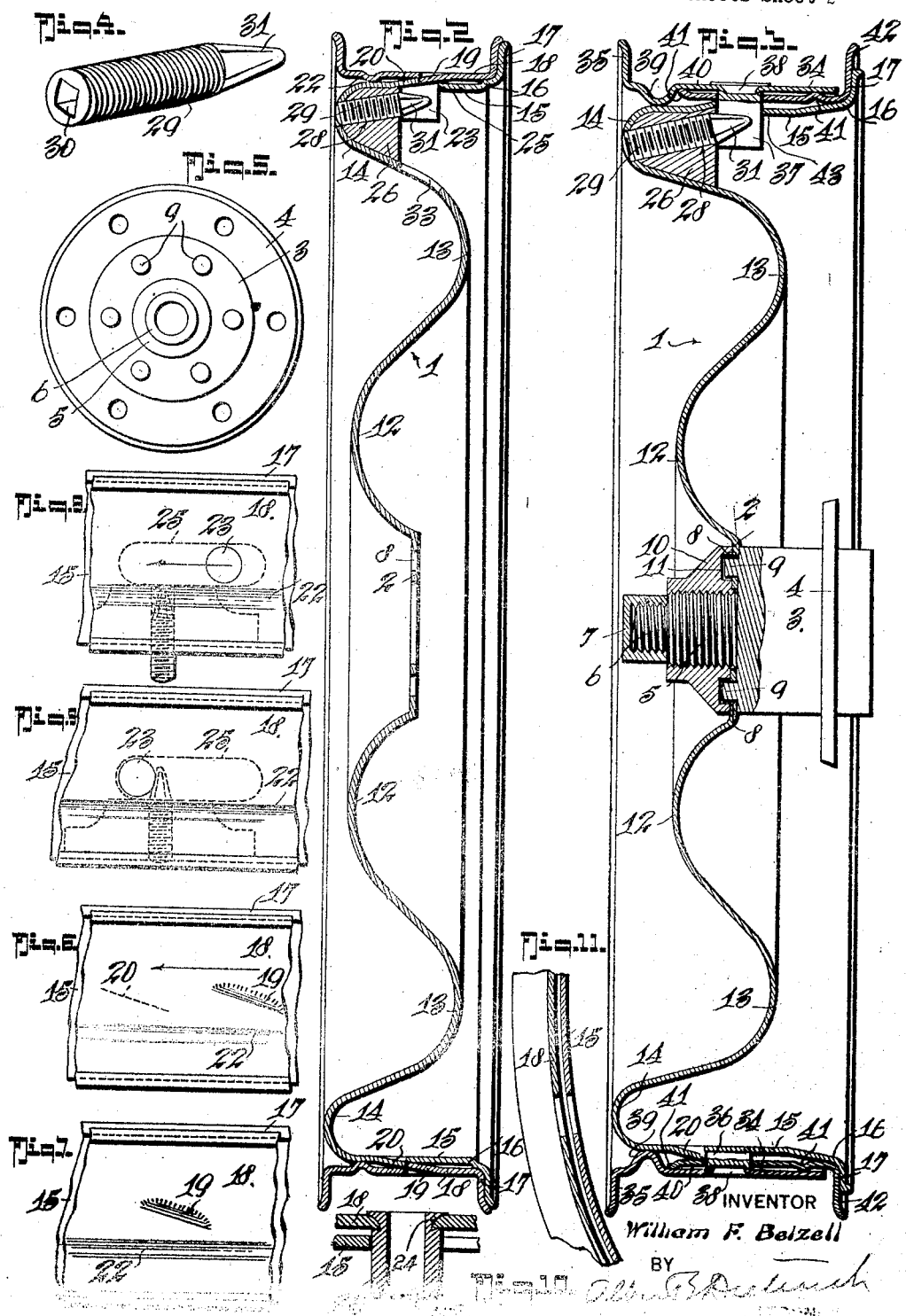
INVENTOR
William F. Betzell
BY Patented Mar. 16, 1926.

1,576,895

UNITED STATES PATENT OFFICE.

WILLIAM F. BETZELL, OF WASHINGTON, DISTRICT OF COLUMBIA.

VEHICLE WHEEL.

Application filed June 24, 1924. Serial No. 722,114.

*To all whom it may concern:*

Be it known that I, WILLIAM F. BETZELL, a citizen of the United States, residing at Washington, in the District of Columbia, have invented certain new and useful Improvements in Vehicle Wheels, of which the following is a specification.

The invention generally relates to vehicle wheels and primarily has for its object to provide such a wheel equipped with demountable rim features more securely cooperative with the wheel parts in holding the tire thereupon than those now commonly employed and which are so cooperatively secured to such wheels that the demounting act is greatly facilitated both as to the time and the labor necessary to accomplish the same.

Motorists of the present advanced automobile production era practically refuse to use machines the wheels of which are not equipped with demountable rims and strenuously object to the common types now in use in which it is necessary to remove a great number of securing lugs. Therefore, it is the object of this invention to provide a wheel having demountable rim features which include a plurality of holding devices distributed around the rim to hold the parts together when cooperatively brought together for that purpose, and a single securing means operable to secure the parts to their cooperative condition; the features thus provided making it possible to change a tire in a fraction of a minute.

The invention further resides in constructing the single securing device in a manner for very effectively accomplishing the securing act, and preventing inadvertent loosening thereof.

The invention further resides in the provision of features of construction for adapting the demountable rim features to use in carrying tires of the balloon type and also in cooperation with the wheels of the metal felly type.

With the above and other objects in view that will hereinafter appear, the invention still further resides in those novel details of construction, combination and arrangements of parts, all of which will be first fully described, then be particularly pointed out in the appended claims, reference being had to the accompanying drawings, in which:—

Figure 1 is a side elevation of part of a wheel embodying the simplest form of the invention, parts being in section.

Figure 2 is a vertical cross section of a wheel constructed as shown in Figure 1.

Figure 3 is a vertical cross section of a wheel embodying modified features of the invention adapting the same for use in securing balloon or oversize tires.

Figure 4 is a detail perspective view of the securing member.

Figure 5 is an elevation of the wheel hub, showing the positions of the wheel engaging lugs or pins.

Figures 6 and 7 are plan views diagrammatically illustrating the disengaged and engaged positions respectively of the holding lugs.

Figures 8 and 9 are plan views diagrammatically illustrating the inactive and active positions respectively of the securing means.

Figure 10 is a detail cross section illustrating the securing lug constructed hollow to permit tire valve passage.

Figure 11 is a detail section illustrating the rim and felly as holes equipped to permit tire valve passage.

Figures 12 and 13 are vertical cross sections diagrammatically illustrating the manner of mounting the main and modified carrying rims respectively upon the rim portion.

Figure 14 is a detail cross section of a modified application of features of the invention.

Figures 15 and 16 are detail perspective views of portions of the carrying rim and felly respectively as modified in Figure 14.

Figure 17 is a detail cross section showing the depressions formed by the holding lugs as smooth welded.

Figure 18 is a plan view of a portion of the two-part rim member showing the bayonet slot feature.

In this disclosure of the principles of the invention, the wheel is shown as constructed of the disk type in which case the same will, of course, be formed up from steel or other suitable material.

The wheel disk 1 includes a hub engaging portion 2 adapted to engage the hub 3 which is provided with the usual flange 4, an extended and threaded shank 5 and a further reduced and threaded extension 6 adapted to receive the hub cap 7.

The hub engaging portion 2 is provided with a plurality of apertures 8 adapted to receive the pin projections 9 formed on the hub 3 to positively cause the disk wheel to rotate with the said hub, and a master nut or securing head 10 is provided to secure the said portion to the hub, an annular groove 11 being provided therein for permitting movement of the nut relative to the pins 9.

The disk portion 1 of the wheel is preferably shaped so that a radial section thereof from hub engaging portion to periphery will form a sinuous curve providing a plurality of resilient convolutions 12, 13 and 14. By thus forming the disk, the wheel is quite resilient and the substantially continuous curve overcomes all tendency of portions of the disk to crystallize and break under the strains of continued use.

The final curve 14 is directed reversely and merges with a flat rim portion or felly 15 concentric with the axis of the hub engaging portion 2, the said felly being crimped as at 16 to form a small area circumferential contact and bent up as at 17 to form an annular abutment flange.

A tire carrying rim 18 is provided which is of a dimension for freely telescoping the felly 15 and for being circumferentially movable thereupon. This tire carrying rim includes tire engaging flanges, which may either be of the straight or clincher type according to the proposed use thereof.

The tire carrying rim is provided with a plurality (six being shown) of pressed-in angle-positioned holding lugs 19 adapted, when the said rim is mounted over the felly 15 and turned slightly thereupon circumferentially, to engage, in holding relation, similarly positioned and formed outwardly projecting holding lugs 20 with which the felly is provided for the purpose of holding the said felly and the carrying rim together, see Figures 6 and 7.

It will be observed by reference to Figure 17 that the depression made by stamp forming the lugs 19 and 20 may be weld filled, as at 21, to provide a neat finish and a smooth tire engaging portion, this feature also contributing toward strengthening the said lugs.

The tire carrying rim may also be crimped as at 22 to provide a spot contact and to thereby cooperate with the crimp 16 of the felly in preventing any tendency to stick, thus facilitating ready demounting of the said rim.

A single securing lug 23 is countersink riveted as at 24 to the tire carrying rim at a point intermediate two of its holding lugs, and a longitudinal slot 25 is provided in the felly 15 to receive the said securing lug and to permit a sufficient degree of circumferential movement thereof to bring the holding lugs 19—20 in holding contact, as before mentioned.

The acute relation of the outermost curve 14 and the felly 15 merging therewith provides an annular pocket or groove. In this groove, at a suitable point relative to the slot 25, a screw bearing filler member 26 is rivet secured as at 27. The member 26 is provided with a transversely arranged screw bearing tap 28 for accommodating the screw securing member 29 which is provided with a non-circular turning socket 30 and a cam head 31 having a plurality of flat faces, see Figures 2, 3 and 4. After the tire carrying rim has been mounted over the felly of the wheel body in the manner illustrated in Figure 12, and turned circumferentially thereupon to bring the holding lugs 19—20 into holding relation, the securing screw 29 is screwed home so that the cam head 31 thereof will engage the securing lug 23 to secure the tire carrying rim to the holding lug engaging position and tending to force the said securing lug against the end of the slot 25 and the respective one of the flanges of the said rim against the abutment flange 17, thus securely holding the felly and rim together against all possibility of rattling. When screwed home, one of the flat surfaces of the cam head will always flatly engage the securing lug 23 and thereby prevent inadvertent turning of the securing member 29, see Figures 8 and 9.

The securing lug 23 may be formed sufficiently large and hollow as at 32, in the manner illustrated in Figure 10, and the wheel disk provided with a suitable hole 33 for permitting passage of the valve of the tire carried by the wheel. If it is found desirable to leave the securing lug solid, suitable holes may be provided through the rim to permit passage of the valve, see Figure 11.

I have thus far described the invention as applicable to the smaller and more common types of wheels for carrying ordinary types of tires.

In Figure 3 is illustrated a modified form of the invention adaptable for use in carrying the oversize and balloon types of tires in which case, of course, the felly and the tire carrying rim are much wider than for the smaller types of tires. In this form of the invention, the wheel disk and felly are substantially identical in construction as that hereinbefore described and like numerals of reference are used to indicate those parts.

In this form of the invention, a modified construction of carrying rim is provided. The tire carrying rim is constructed of two telescopic sections 34 and 40.

The outer section 34 is provided with a tire securing flange 35 and a plurality of inwardly projecting holding lugs 36 (the equivalents of the lugs 19 before described) and a single inwardly projected securing lug 37. All of the lugs 36 and 37 are countersink riveted as at 38 to the said rim section. The rim section 34 is also crimped at 39 to provide a small area circumferential contact with the felly of the wheel proper.

The inner telescopic section 40 is adapted to lie intermediately of the section 34 and the felly 15 of the wheel, is crimped as at 41 to provide small area circumferential contacts with the cooperating section 34, is provided with a securing flange 42, and a plurality (equivalent to the number of lugs 36 and 37) of bayonet slots 43 adapted to receive the lugs 36 and 37 when the rim sections 34 and 40 are cooperatively joined to be mounted upon the felly 15, as a unit, in the manner illustrated in Figure 13 of the drawings.

In this last form, when the sections 34 and 40 are cooperatively joined and mounted upon the felly 15, as a unit in the manner illustrated in Figure 13, they are circumferentially moved to bring the holding lugs 36 thereof into holding contact with the lugs 20 of the said felly and secured to that position by the securing member 29 in the manner hereinbefore described, the flange 42 of the section 40 being forced into tight engagement with the abutment flange 17 of the felly to prevent all tendency toward rattling and of displacement of the intermediate rim section 40.

In Figures 14 to 16 inclusive is illustrated a still further modification of the invention wherein certain features thereof are adapted for use in connection with a common type of wheel having a metallic felly.

In the form of the invention last stated, the metallic felly is designated 44 and spokes which project through and carry the same 45. The felly 44 includes the side flanges 46 and the abutment flange 47. The tire carrying rim 48 is provided with a single securing lug 49 and a plurality of holding lugs 50 which, when the said tire carrying rim is mounted upon the felly are inserted through the slots 51 provided in one side flange and adapted to be turned into engagement with a like number of holding lugs 52 formed on the said flange. A securing screw 53 serves to engage the securing lug 49 for purposes hereinbefore described in detail. It will be observed that the elements stated in this modification are the full mechanical equivalents of those relating to other forms of the invention hereinbefore described in detail.

From the foregoing description, taken in connection with the accompanying drawings, it is thought the complete constructions, the manner of operation and the advantages of the invention will be readily apparent to those skilled in the art to which it relates.

What I claim is:

1. In a wheel of the character described, a felly and a tire carrying rim circumferentially movable thereupon, holding lugs carried by the felly and the tire carrying rim and adapted when the same are moved circumferentially one upon the other to co-engage to hold them together or to release them from such hold according to the direction of such movement, a securing lug carried by the tire carrying rim, and a securing screw carried by and positioned substantially parallel to the axis of the felly and adapted to be brought into engagement with the securing lug to secure the said felly and the tire carrying rim to the held-together position, the said screw having a cam head shaped to force the securing lug circumferentially.

2. In a wheel of the character described, a felly and a tire carrying rim circumferentially movable thereupon, holding lugs carried by the felly and the tire carrying rim and adapted when the same are moved circumferentially one upon the other to co-engage to hold them together or to release them from such hold according to the direction of such movement, a securing lug carried by the tire carrying rim, and a securing screw carried by and positioned substantially parallel to the axis of the felly and adapted to be brought into engagement with the securing lug to secure the said felly and the tire carrying rim to the held-together position, the said screw having a cam head shaped to force the securing lug circumferentially and having flattened faces thereon for engaging said lug in a manner preventing inadvertent rotation.

3. In a wheel of the character described, a felly including an outwardly turned abutment flange at one side thereof and an inwardly turned portion at the other and having a longitudinal slot therein and a plurality of angle-positioned outwardly projecting holding lugs, a tire carrying rim mountable on the felly and having an inwardly projecting securing lug adapted to fit into the longitudinal slot and a plurality of inwardly directed angle-positioned holding lugs adapted to engage those of the felly for holding said rim upon said felly or for releasing the same accordingly as said holding lugs are moved into or out of engagement, a bearing lug secured in the inwardly curved portion of the felly adjacent the position of the longitudinal slot and having a substantially horizontally-transversely directed screw tap, and a securing screw operable in the screw tap and adapted to be brought into engagement with the securing lug to secure the said felly and tire carrying rim to the held-together position, the said screw having a cam head shaped to engage the said securing lug to exert a circumferential force thereagainst and having flattened surfaces for preventing inadvertent rotation.

WILLIAM F. BETZELL.